No. 746,187. PATENTED DEC. 8, 1903.
R. W. SNOWDON.
SHOE HOLDER.
APPLICATION FILED MAY 16, 1902.
NO MODEL.
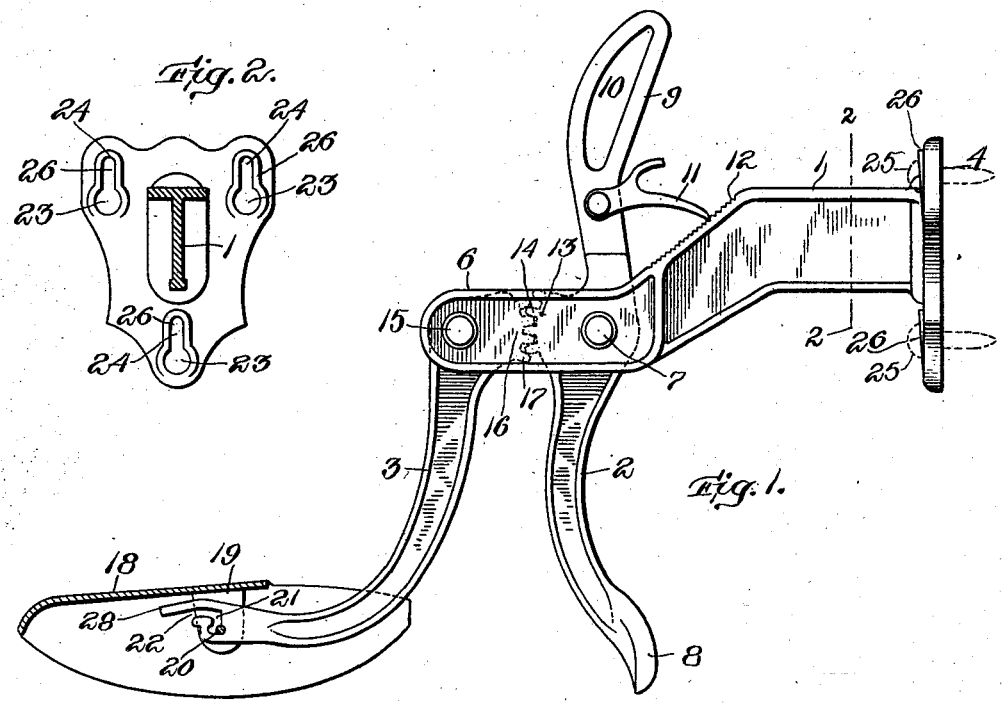
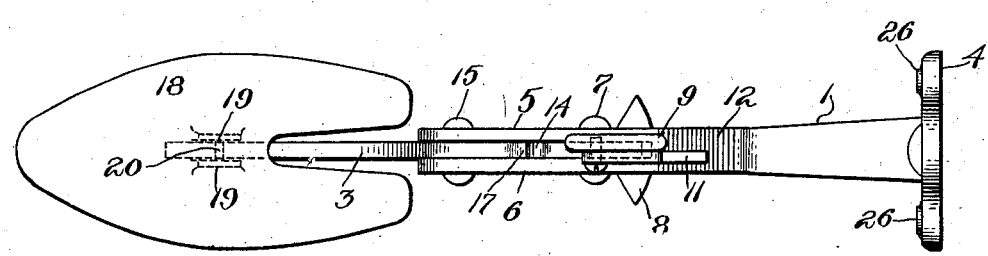
Witnesses:
Arthur F. Randall
Oscar F. Hill
Inventor:
Richard W. Snowdon
by Wm. A. Copeland
Attorneys No. 746,187.  Patented December 8, 1903.

UNITED STATES PATENT OFFICE.

RICHARD W. SNOWDON, OF BOSTON, MASSACHUSETTS, ASSIGNOR TO L. C. BLISS & COMPANY, OF BOSTON, MASSACHUSETTS.

SHOE-HOLDER.

SPECIFICATION forming part of Letters Patent No. 746,187, dated December 8, 1903.

Application filed May 16, 1902. Serial No. 107,612. (No model.)

*To all whom it may concern:*

Be it known that I, RICHARD W. SNOWDON, a citizen of the United States, and a resident of Boston, in the county of Suffolk and State of Massachusetts, have invented certain new and useful Improvements in Shoe-Holders, of which the following is a specification.

The object of this invention is to provide a holder for boots and shoes while being cleaned or polished and to provide means by which it is adapted for shoes of varying shapes and sizes and means by which it may be readily and conveniently attached to and detached from a support.

The invention will now be fully described, reference being made to the accompanying drawings, and the novel features thereof will be particularly pointed out in the claims at the close of the specification.

In the drawings, Figure 1 is a side elevation, partly in section, showing a device embodying the invention. Fig. 2 is a section on line 2 2 of Fig. 1 to show the flanged head of the arm by which the device is attached to the wall. Fig. 3 is a plan.

Referring now to the drawings, the arm 1 has pivoted thereto two levers 2 3, having gear-teeth which mesh with each other, so that by turning either lever on its pivot the other lever will be turned on its pivot in the opposite direction, one of the two levers having a heel-piece which is adapted to bear against the inner face of the counter and the other lever having pivoted thereto a toe-piece which is adapted to enter the toe of the shoe when the two levers are spread apart, the operating-lever 2 having a pawl which engages with ratchet-teeth on the arm 1 to hold the two levers in their adjusted position.

The arm 1 is provided with a plate or head 4, by which it may be readily attached to the wall or other support, as will be more particularly described hereinafter.

The arm 1 is preferably formed with its forward part forked or split, forming two side branches 5 6, between which the two levers are pivoted. Lever 2 is mounted on pivot 7 and has at its lower end a heel-piece 8, which is preferably curved, so as bear against the counter of the shoe without injuring the counter when in use. The upper end of the lever 2 is formed with a handle portion 9 to operate the lever and is preferably formed with a slot 10, or other suitable provision is made by which the holder may be hung up when it is detached from the wall.

Pivoted to lever 2 is a pawl 11, which engages with ratchet-teeth 12 on arm 1, so as to retain the levers in the adjusted postion when in use. Preferably the arm 1 is formed with an inclined portion on which the ratchet-teeth are formed, so that as the handle 9 is pushed forward to spread the levers the pawl will be more firmly held than if the ratchet stands horizontally.

Lever 2 is formed with a segmental portion 13, of which pivot 7 is the center, and having gear-teeth 14.

Lever 3 is mounted on pivot 15 and is formed with a segmental portion 16, of which pivot 15 is the center, and having gear-teeth 17, which mesh with teeth 14 on lever 2. Lever 3 is preferably curved forwardly at its lower end and has connected therewith a rocking toe-piece 18, so that when the toe-piece is pushed forward into the toe of the shoe, although the lever 3 is constantly changing its angle, the full length of the toe-piece will be kept up against the inner side of the upper of the shoe. The best method of constructing and hanging the toe-piece now known to me is that shown in the drawings. The toe-piece 18 is a shell-shaped to enter the toe of the shoe and is formed with two ears or hangers 19, depending from the roof of the shell somewhere intermediate of the ends, preferably about midway. Extending across between these ears is the pin 20, on which the toe-piece 18 is hung. The forward part of lever 3 is formed with a transverse slot 21, having an entrance 22 to the upper part thereof to admit the rocker-pin 20, the toe-piece then dropping down, so that the rocker-pin rests in the bottom of the slot and prevents the toe-piece from being accidentally disconnected, but readily permitting removal by lifting the toe-piece slightly and then withdrawing it. The branch of the lever 3 which forms the upper side of the slot should have an overreaching portion 28, which serves as a stop to limit the downward rock of the forward end of the toe-piece.

The head or flange 4 is preferably cast with the arm and is formed with a plurality of elongated holes, the lower portions 23 being larger than the upper or neck portions 24, so that if screws 25 are inserted in the wall in the same relation to each other as are the holes in the plate and stand out from the wall the holder may be attached by pushing it back to the wall so that the heads of the screws will pass through the enlarged parts of the holes and then sliding the holder down so as to bring the shanks of the screws into the necks 24 of the slots. As an additional means of securing the holder firmly there is formed around each hole in the flange 4 a raised portion 26, wedge-shaped in cross-section, thickest at the upper end and tapering downward, the screws having preferably round heads, having square shoulders on the under side of the heads, so that as the holder is pushed down the wedges which form the sides of the slots will wedge against the shoulder of the screw-head and hold the device firmly against its support. The screws should be set into the wall to a sufficient distance so that the wedges will prevent the holder from going down far enough to take up the full length of the slot in order to allow for wear or extra pressure.

When the holder is in use with a shoe mounted thereon and being polished, the pressure is downward, so that the harder the pressure the more firm will be the holder.

It is preferable to have at least three holes and holding-screws, two at the top and one at the bottom, so as to have three points of support.

When the operator is through using the holder, it can be easily removed from the screws and hung up by means of the handle 9 either on one of the screws or on a hook, and thus lie flat against the wall.

It is preferable to have the gear-teeth on the two levers formed on segments of equal radii, so that when the holder is attached to the wall and the levers are spread they will move with equal speed and the toe and heel be kept on a level with each other.

If the shoe is so full that the rear part of the toe-piece is not high enough to fill it, the pressure of the forward part of the toe-piece against the upper when the toe-piece is forced into the toe of the shoe will rock up the rear part of the toe-piece and crowd it up against the upper, thereby stretching the upper of the shoe, so that a firm surface is maintained at all points for polishing.

What I claim is—

1. A shoe-holder comprising an arm, two levers pivoted thereto one of which has a portion adapted to engage with the inner face of the counter of a shoe and the other of which has a toe-piece adapted to enter the fore part of a shoe, segment-gears on said levers which engage each other and cause said levers to turn in opposite directions, and means for retaining the said levers in their adjusted positions, substantially as described.

2. A shoe-holder comprising an arm, two levers pivoted thereto, one of which has a portion which engages with the inner face of the counter of the shoe and the other of which enters the fore part of the shoe, segment-gears on said levers which engage each other and cause said levers to turn in opposite directions, said gears being on segments of equal radii, and means for retaining said levers in their adjusted positions, substantially as described.

3. In a shoe-holder, a lever having a transverse slot in the end thereof, a toe-piece having intermediate its ends a rocker-pin by which it is hung in the slot in said lever, and a stop which limits the downward motion of the fore part of the toe piece, substantially as described.

4. In a shoe-holder, the combination with the arm engaging the inner side of the rear end of the shoe, of the companion arm provided with an extension and with a hook, and the plate shaped to enter the front portion of the shoe and resting on the aforesaid extension and provided with a cross-bar engaging the aforesaid hook, as set forth.

In testimony whereof I have affixed my signature in presence of two witnesses.

RICHARD W. SNOWDON.

Witnesses:
WILLIAM A. COPELAND,
ROBERT WALLACE.